Patented Jan. 30, 1940

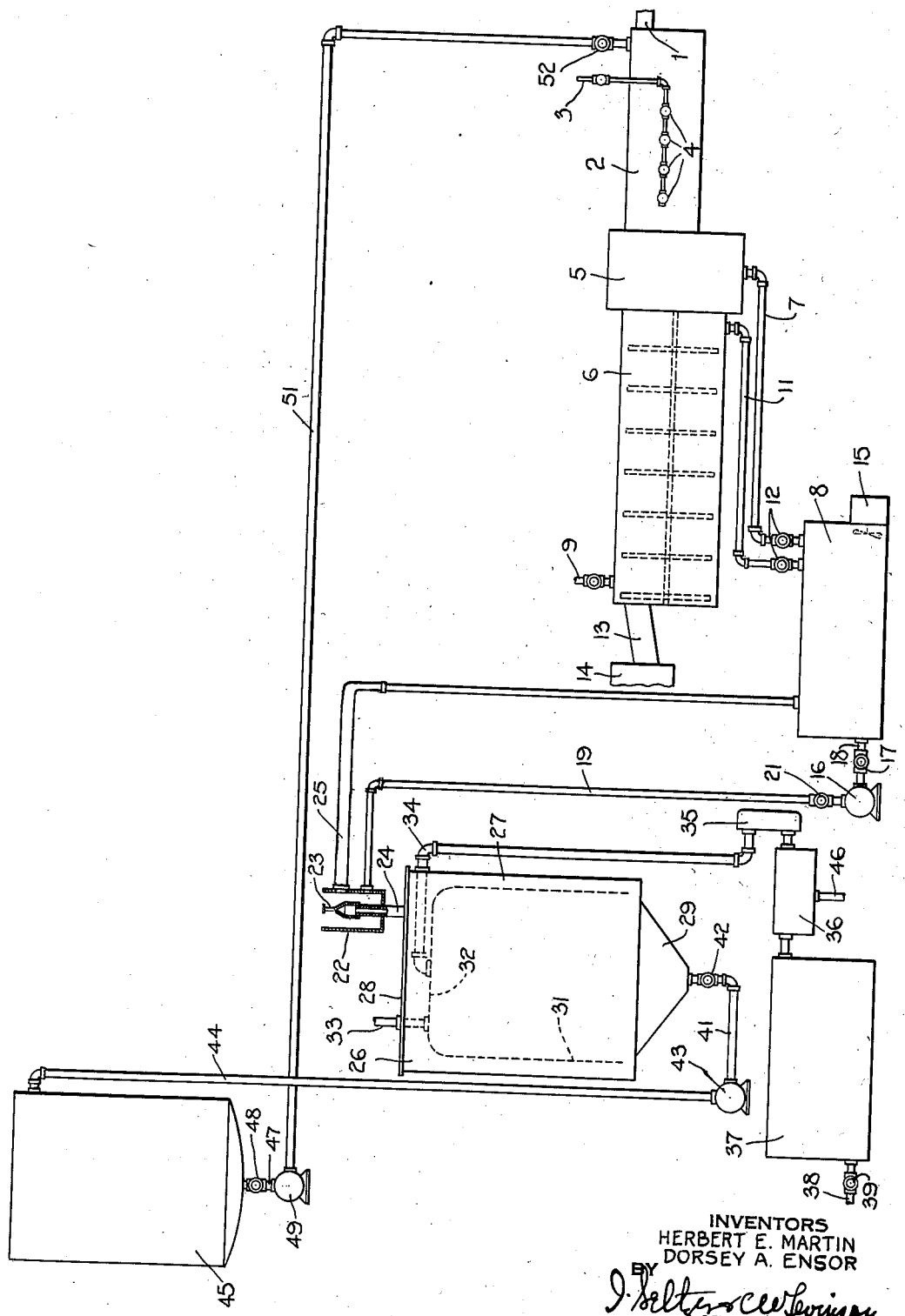

2,188,392

UNITED STATES PATENT OFFICE 2,188,392

PURIFICATION OF ORGANIC SUBSTITUTION DERIVATIVES OF CELLULOSE

Herbert E. Martin and Dorsey A. Ensor, Cumberland, Md., assignors to Celanese Corporation of America, a corporation of Delaware Application June 7, 1938, Serial No. 212,230

11 Claims. (Cl. 260—230)

This invention relates to the production of cellulose acetate or other organic derivative of cellulose, and more particularly to the recovery of that part of the cellulose acetate or other organic derivative of cellulose which is colloidally dispersed or partially dissolved in the precipitating, stabilizing and washing liquids.

An object of the invention is the economic production of cellulose acetate or other organic derivative of cellulose by recovering that fraction of the derivative of cellulose that is colloidally dispersed or partially dissolved in the acid liquors removed from precipitators, stabilizers, washers, etc. employed in the production of the derivative of cellulose. Other objects of the invention will appear from the following detailed description and drawing.

In the drawing there is shown, more or less diagrammatically, a device for carrying out the recovery of cellulose acetate or other derivative of cellulose which normally was lost in the liquors removed from the process.

Although this invention is applicable to the production of any organic derivative of cellulose or like material, it will be described with particular reference to the production of cellulose acetate. Examples of the organic derivatives of cellulose are the cellulose esters and cellulose ethers. Examples of the cellulose esters, besides cellulose acetate, are cellulose formate, cellulose propionate and cellulose butyrate, while examples of the cellulose ethers are ethyl cellulose, methyl cellulose and benzyl cellulose. Obviously the invention is applicable to the production of organic esters of cellulose in the same manner as to the production of cellulose acetate, the only difference being in the name of the acid to be recovered. In the production of cellulose ethers, however, alkali or basic solutions would be employed in place of acid solutions.

In the manufacture of cellulose acetate, cellulose in the form of cotton. cotton linters, wood pulp, etc., is acetylated by treatment with acetic anhydride and a catalyst, such as sulphuric acid, hydrochloric acid. etc., in the presence of glacial acetic acid which acts as a solvent for the cellulose acetate as it is formed. After acetylation some water may be added to convert any remaining anhydride to the acid. Additional water may be added for the purpose of hydrolysis and the mixture allowed to stand or ripen until the desired viscosity and solubility characteristics are developed. The ripening step is not necessary in all methods of manufacture of cellulose acetate as the desired solubility characteristics may be produced by controlled acetylation. The cellulose acetate dissolved in the acid or primary liquor is then mixed with a more dilute acid, water or other precipitating liquid to reduce the concentration of the acid to below that at which it is a solvent for the cellulose acetate and the cellulose acetate is thereby precipitated. The precipitation step is performed by beating in the precipitating liquid or beating a fine stream of the dissolved cellulose aceate into the precipitating liquid such that a fibrous or fine particle size precipitate is produced. The liquid is then drained from the precipitate and the precipitate washed with water or stabilized with chemicals or boiling water, or a combination of these treatments, and then washed, drained and dried. The liquids from the precipitator, stabilizer and washer, when combined, contain from 1 to 4% or more on the weight of the cellulose acetate produced of solids which are sometimes termed "fines". About half or a little more than half of these solids are a commercial grade cellulose acetate while the rest is a mixture of compounds, formed during the reaction, which are unsuitable for use in the production of filaments, plastics, etc., and are for the most part acetates of degraded cellulose. This latter part of the solids are soluble or partially soluble in the dilute acid. The part containing commercial grade cellulose acetate is carried in the acid liquor as a very fine suspension or as a colloid or both.

Attempts to filter the liquid to save this material have met with some success. It is an expensive procedure, however, and after a cake is built up on the filter much of the undesired part of the "fines" is also collected while even with the finest of filtering media some of the commercial grade cellulose acetate passes therethrough. To disregard this fraction of cellulose acetate is also expensive not only because of the loss of the ½% to 2½% or more of cellulose acetate produced, but also because these fines are carried over into the acid recovery plant, where they break down and form a very viscous tacky sludge which necessitates dual systems of recovery so that the systems may be shut down one at a time for manual cleaning and removal of this sludge.

We have found that these solids, or fines as they are sometimes called, may be removed from the dilute acids with the result that a clean acid may be delivered to the acid recovery plant and also that the commercial grade cellulose acetate fraction of the fines may be recovered in a condition such that it is substantially free of degraded products. In accordance with this invention this is performed in a mechanical and continuous manner. However, the invention by slight modification, such as by the use of storage tanks, may be employed in processes which manufacture cellulose acetate by batch methods. This invention is not limited to the treatment of organic derivatives of cellulose in their primary solutions but may be employed wherever an organic derivative of cellulose is precipitated from any solution.

In accordance with our invention, we recover the commercial grade cellulose acetate or other organic derivative of cellulose, contained as fines in the dilute acid obtained from the manufacture of cellulose acetate or other organic derivative of cellulose and pass on to the acid recovery plant a liquid free of tacky sludge forming compounds. This we accomplish by promoting conditions in the dilute acid which cause the agglomeration of the solid particles of commercial grade cellulose acetate, allowing them to settle from the dilute acid, mixing the settled sludge with unprecipitated material which redissolves or entraps the commercial or desired product, which is the insoluble part at precipitation. The undesired part is carried off with the dilute acid from the precipitator, stabilizer or washer. The fraction that is soluble or part soluble in the very dilute acid upon standing in contact with the acid, especially if a small amount of sulphuric acid is present, breaks down to compounds that are soluble in the water leaving the acid recovery system and, therefore, they do not form a sludge that adheres to the recovery system, or they settle out in the storage tanks of the recovery system and may be withdrawn by flowing them from the bottom of the tanks without the necessity of emptying the tanks and manually scraping and flushing same.

For the purpose of describing the invention reference will be made to the drawing and to a particular set of acid concentrations, etc., met with in one method of producing cellulose acetate. Obviously, in other methods of producing cellulose acetate differences in concentration of the acids or other reagents removed from the different process steps and returned to the system will vary greatly.

In the system of recovery shown in the drawing, cellulose acetate dissolved in acid which is substantially all glacial acetic acid enters the system at 1. This cellulose acetate may be introduced into the system directly from the acetylizer, from the ripening process, or from any other suitable source wherein the cellulose acetate is in solution. The cellulose acetate then enters a precipitator 2 which contains a plurality of zones through which the cellulose acetate must travel. In each of the zones there is mixed with the cellulose acetate a dilute solution of acetic acid, for instance of 20% to 40% concentration. This acid is introduced into the precipitator by means of the feedline 3 having individual feeds 4 leading to the various zones. If desired, any catalyst present may be neutralized during the precipitation.

The cellulose acetate after being precipitated in the precipitator 2 is carried with acetic acid, diluted to, say, 40% concentration, into a feeder 5 which, by means of rotating screens or other devices, drains the precipitated cellulose acetate free of the acid and discharges it into a washer 6. The acid drained from the feeder 5 is carried through a pipe line 7 to a mixing chamber 8. The washer 6 may be of any suitable type such as one containing a plurality of zones wherein the cellulose acetate is moved counter-current to a stream of water introduced through the header 9. The liquid being drained from the washer through the pipe 11 may contain acetic acid of from 10 to 20% concentration. This dilute acid is also carried to the mixing chamber 8. The pipe lines 7 and 11 are suitably controlled by valves 12.

The bulk of solid cellulose acetate is carried forward through the washer into a distributing device 13 which feeds a suitable drier 14. However, due to the vigorous beating of the material in the step of precipitation and to other treatments causing abrasion as in the feeder 5 and the washer 6, the liquids being drained through the pipes 7 and 11 contain anywhere from 1% to 4% or more of fines. As stated above, some of these fines are in suspension or colloidal dispersion and comprise commercial grade cellulose acetate, while another part of the fines may be in solution in the 40% acid coming from the feeder. However, some of the fines in this latter part is precipitated upon mixture of the acid coming from the feeder with the more dilute acid flowing through the pipe 11 from the washer. This latter part, as stated above, is a mixture of many compounds, which compounds are in many different physical forms such as true solutions, gels, suspended particles, etc., and being on the whole more finely dispersed than the commercial grade of cellulose acetate found in the same liquid so that by a controlled settling process the fines of commercial grade cellulose acetate may be caused to settle out entrapping but very little of the undesired products. The next step of the process is directed to the settling step, and it will be explained thereafter how a small part of the entrapped undesired particles are removed therefrom.

As stated above, the acid liquors coming from the precipitator and the acid coming from the washer, the former being, in the present example, of about 40% concentration acetic acid and the latter from 10 to 20% concentration of acetic acid, are delivered to a mixing chamber 8 which may be provided with a suitable mixing device 15 which effects a mixing of the two liquids, thus lowering the concentration of the acid to a point where all the commercial grade cellulose acetate, as well as many of the undesired products, are in solid form. This mixing of the liquids and reducing of the concentration also has another effect, namely causing the cellulose acetate particles to agglomerate into groups of such a mass that they will settle out of the liquid. The liquid of the mixing chamber 8 is withdrawn by means of a pump 16 through a valve 17 and pipe line 18 and is then pumped through the pipe line 19 controlled by valve 21 to a flow regulating device 22. The flow regulating device is provided with a valve 23 having an open top permitting the flow of liquid down through the pipe line 24. From the flow regulating device 22 is an overflow 25 which returns any excess liquid to the mixing chamber 8. By raising and lowering the open top valve 23 relative to the overflow line 25 any suitable quantity of liquid may be flowed through the line 24 into a settling tank 26. The settling tank may be constructed of a cylinder 27 having a closed top 28 and a cone shaped bottom 29. The settling tank has mounted therein a cylinder 31 having an open bottom and a closed top 32 provided with a vent 33 to the air and pipe line 34 for withdrawing the acid. The acid coming from the settling tank 26 through the line 34 passes through a flow meter 35 into a second settling tank 36 and from there it is passed onto a storage tank 37 to be withdrawn to the acid recovery plant through a line 38 controlled by the valve 39.

The dilute acid entering the settling tank is caused by the construction thereof to flow down the outside and to rise on the interior of the cylinder 31, and passes out of the tank through pipe 34. As the dilute acid rises to the cylinder 31 the particles or agglomerates of cellulose acetate suspended therein commence settling and form their own filtering medium as they descend counter-current to the flow of the acid. These particles or agglomerates which settle out fall into the cone 29 in the form of a sludge. This sludge may be withdrawn through the pipe 41 controlled by valve 42 and by means of the pump 43 forced through line 44 to a storage tank 45. The acid leaving the settling tank through the pipe line 34 still contains some fines, the great majority of which are soluble in water or are of such a nature that upon storage for from 1 to 2 or more days in the tank 37 break down to compounds which are soluble in water and when passed to the acid recovery system are discharged therefrom dissolved in the water from which the acid is extracted and do not build up as sludge in the acid recovery system. If desired, in place of the settling tank 36 in which is removed a material containing some commercial grade cellulose acetate but which for the most part comprises solids of undesired characteristics, a heating element may be applied which hastens the breaking down of these undesired products to water-soluble products. Any sludge settling in this second settling tank may be withdrawn through a pipe line 46.

The storage tank 45 contains a relatively heavy sludge composed almost entirely of commercial grade cellulose acetate. However, it does have entrapped therein a small proportion, say from a trace to 10%, of undesired products. This sludge is withdrawn from the tank through the line 47 controlled by valve 48 by means of the pump 49 and delivered through the pipe line 51 controlled by the valve 52 to the feed end of the precipitator or, if desired, to a mixing tank preceding the precipitator. The amount of dilute acid contained in the sludge coming from the storage tank 45 is insufficient to cause any precipitation of the cellulose acetate entering the system, but the cellulose acetate and other products in the sludge are dissolved in the strong acid solution. Upon passing through the precipitator a second time these fines are precipitated in a more coarse form. However, the particles soluble in the more dilute acid that were carried in the sludge from the storage tank 45 remain dissolved in the dilute acid taken from the precipitator and water and go through the system and out through the storage tank 37. It will be seen by this recycling process that fines of cellulose acetate are continually being recovered while the undesired products which are soluble or partially soluble in a more dilute acid are continually being carried out of the system. Instead of returning the fines from the storage tank 45 to the incoming solution of cellulose acetate they may be removed from the system and treated separately to remove the undesired products. This may be accomplished by redissolving and precipitating the material. This latter method may be desired in some instances but it requires additional apparatus whereas by returning the sludge to the precipitator 2 the cellulose acetate is recovered by the same apparatus and with no additional step from that required in the normal precipitation step.

Obviously many modifications of the device shown in the drawing may be made and still carry out the invention of recovering the commercial grade cellulose acetate and removing from the system the undesired products by such a manner that a relatively clean acid is delivered to the acid recovery plant. As stated above, instead of a second settling tank 36 there may be substituted a heater or both a heater and a settling tank may be employed. Obviously any type of flow regulator may be substituted for the flow regulator shown in the device, while any type of precipitator and washing device may be employed. Also contemplated within the scope of this invention is the introduction between the precipitator 2 and the feeder 5 of means for stabilizing the cellulose acetate, which means may constitute a device in which the cellulose acetate is boiled in water with or without chemicals such as sulphuric acid, magnesium carbonate, morpholine compounds, benzyl ethyl aniline, etc.

As an illustration of this invention but without being limited thereto, the following example is given:

*Example*

A solution of cellulose acetate in acetic acid such as is obtained at the completion of the ripening process and containing by weight 21.2% cellulose acetate, 74% acetic acid and 3% water is fed into the precipitator at a rate of approximately 65 pounds per minute. To this solution is added in the first zone of the precipitator a mixture of sludge and acetic acid from tank 45 at respective rates of approximately 0.4 and 8.4 lbs. per minute; and for the purpose of reducing the concentration to almost the precipitating point an addition of aqueous acetic acid of strength 10–11% is also made in the first zone.

Precipitation is brought about by adding more of the aqueous acid of 10–11% strength at or about the middle zone of the precipitator. In all approximately 100 pounds per minute of the aqueous acid are used for diluting the "dope" and to effect precipitation.

Sufficient acetic acid is withdrawn from feeder 5 and washer 6 to maintain the system in balance. The concentration of the acetic acid withdrawn from feeder 5 is 38.9% and the concentration of the acetic acid withdrawn from washer 6 is 27.5%. Insoluble solid products contained in the acetic acid in the mixing vessel 8 are 2.9% of the weight of the finished cellulose acetate.

If desired, some of the acid from tank 38 with or without further dilution with water may be run back to the precipitator 2 for the purpose of precipitating the cellulose acetate. Acid from this source may be substituted for a part of or all the precipitating liquid introduced into the precipitator 2 through the feed line 3.

It is to be understood that the foregoing detailed description is merely given by way of illustration and that many variations may be made therein without departing from the spirit of our invention.

Having described our invention, what we desire to secure by Letters Patent is:

1. The method which comprises treating derivatives of cellulose selected from the group consisting of aliphatic acid esters of cellulose and cellulose ethers with a non-solvent liquid, separating the substantial part of the liquid from the said derivatives of cellulose, allowing the dispersed and suspended matter in the liquid to settle out as a sludge and adding the sludge to a relatively large quantity of said derivatives of cellulose in solution and precipitating said derivatives of cellulose with a liquid precipitating agent.

2. A method of making cellulose acetate, which comprises treating cellulose acetate with a non-solvent liquid, separating the substantial part of the liquid from the cellulose acetate, allowing the dispersed and suspended matter in the liquid to settle out as a sludge and adding the sludge to a relatively large quantity of cellulose acetate in solution and precipitating the cellulose acetate with a liquid precipitating agent.

3. A method of making lower aliphatic acid esters of cellulose wherein the lower aliphatic acid ester of cellulose is in solution, which comprises precipitating the lower aliphatic acid ester of cellulose by the addition to the solution of a liquid precipitating agent, separating the substantial part of the liquid from the precipitated lower aliphatic acid ester of cellulose, allowing the dispersed and suspended matter in the liquid to settle out as a sludge, adding the sludge to a relatively large quantity of lower aliphatic acid ester of cellulose which is in solution and precipitating the lower aliphatic acid ester of cellulose from the solution with a liquid precipitating agent.

4. A method of making cellulose acetate wherein the cellulose acetate is in solution, which comprises precipitating the cellulose acetate by the addition to the solution of a liquid precipitating agent, separating the substantial part of the liquid from the precipitated cellulose acetate, allowing the dispersed and suspended matter in the liquid to settle out as a sludge, adding the sludge to a relatively large quantity of cellulose acetate which is in solution and precipitating the cellulose acetate from the solution with a liquid precipitating agent.

5. A method of making lower aliphatic acid esters of cellulose wherein the lower aliphatic acid ester of cellulose is in solution, which comprises precipitating the lower aliphatic acid ester of cellulose by the addition to the solution of a liquid precipitating agent, separating the substantial part of the liquid from the precipitated lower aliphatic acid ester of cellulose, treating the precipitated lower aliphatic acid ester of cellulose with a non-solvent liquid, combining the precipitating liquid and the treating liquid, allowing the dispersed and suspended matter in the combined liquids to settle out as a sludge, adding the sludge to a relatively large quantity of lower aliphatic acid ester of cellulose in solution and precipitating the lower aliphatic acid ester of cellulose with a liquid precipitating agent.

6. A method of making cellulose acetate wherein the cellulose acetate is in solution, which comprises precipitating the cellulose acetate by the addition to the solution of a liquid precipitating agent, separating the substantial part of the liquid from the precipitated cellulose acetate, treating the precipitated cellulose acetate with a non-solvent liquid, combining the precipitating liquid and the treating liquid, allowing the dispersed and suspended matter in the combined liquids to settle out as a sludge, adding the sludge to a relatively large quantity of cellulose acetate and precipitating the cellulose acetate with a liquid precipitating agent.

7. A method of making lower aliphatic acid esters of cellulose wherein the lower aliphatic acid ester of cellulose is dissolved in an acid, which comprises precipitating the lower aliphatic acid ester of cellulose by the addition to the solution of a precipitating agent containing water, separating the substantial part of the liquid from the precipitated lower aliphatic acid ester of cellulose, washing the precipitated lower aliphatic acid ester of cellulose with water, combining the precipitating liquid with the wash water to effect an agglomeration of the dispersed and suspended lower aliphatic acid ester of cellulose in the liquids, allowing the lower aliphatic acid ester of cellulose in the liquids to settle out as a sludge, adding the sludge to a solution of lower aliphatic acid ester of cellulose dissolved in an acid, precipitating the lower aliphatic acid ester of cellulose with a precipitating liquid containing water thus recovering the lower aliphatic acid ester of cellulose and storing the mixture of precipitating liquid and wash water to effect the digestion of the matter still contained therein until it is soluble in water.

8. A method of making cellulose acetate wherein the cellulose acetate is dissolved in an acid, which comprises precipitating the cellulose acetate by the addition to the solution of a precipitating agent containing water, separating the substantial part of the liquid from the precipitated cellulose acetate, washing the precipitated cellulose acetate with water, combining the precipitating liquid with the wash water to effect an agglomeration of the dispersed and suspended cellulose acetate in the liquids, allowing the cellulose acetate in the liquids to settle out as a sludge, adding the sludge to a solution of cellulose acetate dissolved in an acid, precipitating the cellulose acetate with a precipitating liquid containing water thus recovering the cellulose acetate and storing the mixture of precipitating liquid and wash water to effect the digestion of the matter still contained therein until it is soluble in water.

9. A method of making lower aliphatic acid esters of cellulose wherein the lower aliphatic acid ester of cellulose is dissolved in an acetic acid, which comprises precipitating the lower aliphatic acid ester of cellulose by the addition of a solution of a precipitating agent containing water, separating the substantial part of the liquid from the precipitated lower aliphatic acid ester of cellulose, washing the precipitated lower aliphatic acid ester of cellulose with water, combining the precipitating liquid with the wash water to effect an agglomeration of the dispersed and suspended lower aliphatic acid ester of cellulose in the liquids, allowing the lower aliphatic acid ester of cellulose in the liquids to settle out as a sludge, adding the sludge to a solution of lower aliphatic acid ester of cellulose dissolved in acetic acid, precipitatng the lower aliphatic acid ester of cellulose with a precipitating liquid containing water thus recovering the lower aliphatic acid ester of cellulose and storing the mixture of precipitating liquid with wash water to effect the digestion of the matter still contained therein until it is soluble in water.

10. A method of making cellulose acetate wherein the cellulose acetate is dissolved in acetic acid, which comprises precipitating the cellulose acetate by the addition to the solution of a precipitating agent containing water, separating the substantial part of the liquid from the precipitated cellulose acetate, washing the precipitated cellulose acetate with water, combining the precipitating liquid with the wash water to effect an agglomeration of the dispersed and suspended cellulose acetate in the liquids, allowing the cellulose acetate in the liquids to settle out as a sludge, adding the sludge to a solution of cellulose acetate dissolved in an acid, precipitating the cellulose acetate with a precipitating liquid containing water thus recovering the cellulose acetate and storing the mixture of precipitating liquid and wash water to effect the digestion of the matter still contained therein until it is soluble in water.

11. A method of making lower aliphatic acid esters of cellulose wherein the lower aliphatic acid ester of cellulose is dissolved in a lower aliphatic acid and containing sulphuric acid used as a catalyst, which comprises precipitating the lower aliphatic acid ester of cellulose by the addition to the solution of a precipitating agent containing water, separating the substantial part of the liquid from the precipitated lower aliphatic acid ester of cellulose, washing the precipitated lower aliphatic acid ester of cellulose with water, combining the precipitating liquid with the wash water to effect an agglomeration of the dispersed and suspended lower aliphatic acid ester of cellulose in the liquids, allowing the lower aliphatic acid ester of cellulose in the liquids to settle out as sludge, adding the sludge to a solution of lower aliphatic acid ester of cellulose dissolved in an acid, precipitating the lower aliphatic acid ester of cellulose with a precipitating liquid containing water thus recovering the lower aliphatic acid ester of cellulose and storing the mixture of precipitating liquid and wash water with its unneutralized sulphuric acid to effect the digestion of the matter still contained therein until it is soluble in water.

HERBERT E. MARTIN.
DORSEY A. ENSOR.